June 15, 1926.

J. M. BARRETT 1,588,645

HIGH PRESSURE VALVE

Filed May 4, 1923

INVENTOR
Joseph M. Barrett,
By Davis & Macklin,
ATTYS.

Patented June 15, 1926.

1,588,645

UNITED STATES PATENT OFFICE.

JOSEPH M. BARRETT, OF FOSTORIA, OHIO, ASSIGNOR TO THE S-C REGULATOR MANUFACTURING COMPANY, OF FOSTORIA, OHIO, A CORPORATION OF OHIO.

HIGH-PRESSURE VALVE.

Application filed May 4, 1923. Serial No. 636,776.

This invention is concerned with high pressure valve mechanisms and has for its general object the provision of a valve construction embodying a valve and valve seat therefor adapted to withstand high pressures and high temperatures.

A more specific object of my invention is the provision of a novel valve and seat member having the coacting surfaces thereof arranged in such manner that a preliminary expansion of the high pressure or high temperature fluid passing through the valve into the low pressure side thereof may be effected and thus cause a diversion of the direct flow of the fluid away from the valve surfaces whereby the wire drawing effect upon the valve seat is prevented.

Other obejcts will be hereinafter set forth in the following description of the accompanying drawings which illustrate a preferred embodiment of my invention. The essential characteristics are summarized in the claims.

Figure 1:
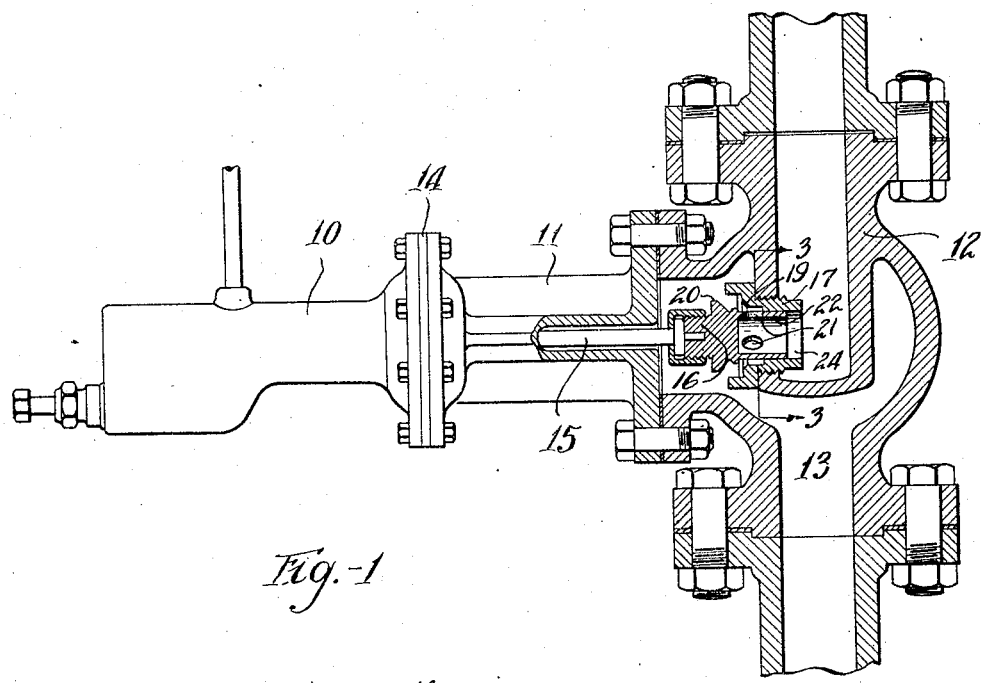
Figure 2:
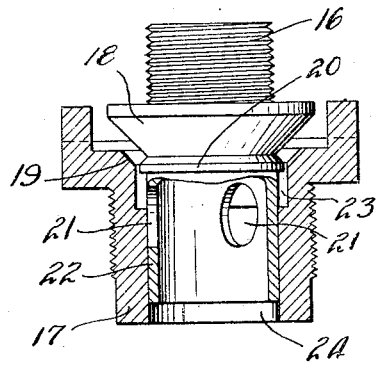
Figure 3:
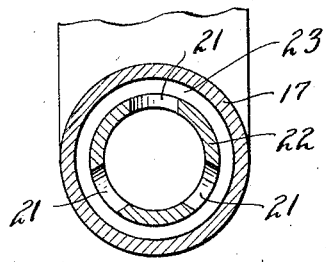

In the drawings, Fig. 1 is a cross sectional view of a diaphgram operated valve embodying my invention; Fig. 2 is an enlarged cross sectional view of the valve member and the valve seat member cooperating therewith; Fig. 3 is a cross sectional view taken substantially along the line 3—3 of Fig. 1.

Recent developments in prime movers, as used in central power stations, has necessitated the use of high pressure boilers which generate the steam against extremely high pressure, and at a high degree of super heat. These extremely high pressures and temperatures rapidly destroy the valve seats of the various valve mechanisms which control the flow of steam in the high pressure line from the boilers to the prime movers. This deterioration is due to a so-called wire drawing action, when the valves are being opened and closed.

My invention, therefore, contemplates the provision of a valve mechanism which will eliminate this wire drawing action, and I effect the desired result by forming a valve seat member with an expansion chamber below the valve seat thereof, and I form a cooperating shoulder on the valve member below the valve seating surface thereof, whereby the hot gasses are permitted to expand before passing the cooperating surfaces of the valve members and are directed away from the valve sealing surfaces. I thus bring about a swirling movement of the gases which together with the shoulder prevents a stream concentration of the hot gases upon the sealing surfaces of the cooperating valve members at the time the valve is first opened or when it is being closed.

For the purpose of illustration only, I show, in Fig. 1, the foregoing idea embodied in a diaphgram operated governor valve such as I disclose in my patent application for a boiler pressure feed regulator filed concurrently herewith. Such a valve, in general, comprises a spring retaining member 10, in clamped relation to a bracket member 11, which is secured to a valve body member 12. The bracket member 11 has a passageway extending from the high pressure chamber 13 of the valve body member 12, whereby pressure in this chamber may be exerted against one side of a diaphragm 14, disposed between the members 10 and 11, and which operate a valve stem 15. It will be noted in Fig. 1 that a valve member 16 is in unseated position relative to its coacting seat member 17, and that the former is mounted upon the end of the stem 15. This condition is brought about when the pressure in the chamber 13 of the valve body 12 exceeds the pressure in the member 10.

Describing in detail the relation of the cooperating portions of these valve members, as shown in the enlarged cross sectional view thereof, in Fig. 2 it will be noted that the valve member 16 is provided with the usual coniform valve closure surface 18, which coacts with a complementary surface 19, formed on the valve member 17. Immediately below the valve sealing surface 18, is a steam baffle in the nature of an annular shoulder 20, which is adjacent port openings 21, formed in the sleeve portion 22. The valve member 17 has a counterbored expansion chamber 23, which receives the annular baffle shoulder 20, when the respective valve members are in closed or seated relation.

The opening 24 formed in the member 17 and in which the sleeve 22 of the valve member 16 slidably engages the valve seat member 17, is sufficiently larger in diameter than the diameter of the sleeve 22, whereby a substantial space is provided between the walls of the respective members. Likewise, the diameter of the counterbored space 23 and the diameter of the baffle shoulder 20 are such that a substantial space is provided therebetween. It will thus be seen that when the coniformed valve surface 18 is raised from the seat 19 a slight distance, a steam passage is provided between the sleeve 22 and the wall of the bore 24 of the member 17, which passage is interrupted by the annular baffle shoulder 20, and the steam which is moving at a high velocity is caused to swirl in the expansion chamber 23 before passing the shoulder 20 and before it strikes against the coniform surface 18. A further raising of the valve member establishes a communication between the two chambers of the valve body member 12 through the ports 21.

The foregoing described action of diverting the direct flow of the steam from the coniform valve surfaces 18 and 19, also takes place when the valve member 16 is being lowered and is approaching its seating position upon the coniform surface 19 of the valve seat member 17.

A distinct advantage in my valve construction is to be found in the simplicity and economy of the manufacturing of the coacting valve parts in that the coacting sliding surfaces need not be accurately machined. The only close fitting surfaces of the valve parts are the coniform valve surface 18 and the valve seat 19 formed on the respective members. Furthermore, a valve embodying a valve seat member and a cooperating closure member, made in accordance with the foregoing disclosure, will be found to have extraordinary wearing qualities when used in high pressure and high temperature systems, and all deteriorating wire drawing effects are eliminated. It is to be understood that my invention is adaptable to a variety of valve constructions in different classes of high pressure valves.

I claim:—

1. In a high pressure valve, the combination of a valve body and a coniformed valve closure member, said valve body having a counterbored valve seat, said closure member having fluid deflecting means carried thereby and disposed below said coniformed surface whereby said means will cause the fluid escaping through the valve opening to be deflected into said counterbored portion of the valve body and away from the coniformed surface of the closure member.

2. In a valve, the combination of a valve seat member, a closure valve member mounted therein, the closure member having a sleeve portion slidable in a bore of the valve seat member, said closure member having an annular shoulder disposed between the valve closing surface thereof and said sleeve portion, said valve seat member being counterbored to receive said shoulder portion of the closure member, said counterbored portion of the valve seat member providing an expansion chamber for the fluid deflected by said annular shoulder away from the valve closing surfaces thereof.

3. In a valve, the combination of a valve seat member, a closure valve member slidably mounted therein, the closure member having an annular shoulder disposed between the valve closing surface thereof and the steam passageway through the valve seat member, said valve seat member being counterbored to receive said annular shoulder.

In testimony whereof, I hereunto affix my signature.

JOSEPH M. BARRETT.